2,857,405

PROCESS OF PREPARING 17-METHYL-ESTRADIOL

Georg Stoeck and Hans Voigt, Mannheim, Germany, assignors to C. F. Boehringer & Soehne G. m. b. H., Mannheim, Germany No Drawing. Application May 6, 1954
Serial No. 428,126

Claims priority, application Germany May 15, 1953

3 Claims. (Cl. 260—397.5)

This invention relates to a new and improved process of making 17-methyl estradiol.

17-methyl estradiol, in contrast to estrone and estradiol, has a high estrogenic activity on oral administration. This compound, therefore, has proved to be of considerable value in hormone therapy.

Attempts have been made to produce 17-methyl estradiol by reacting estrone with methyl magnesium iodide and splitting up the reaction products by means of hydrolyzing agents. The suggestion has not proven to be satisfactory for that purpose. On the contrary, when subjecting estrone to the action of methyl magnesium iodide, the starting material is obtained in practically unchanged form.

It is one object of the present invention to provide a process which yields in a simple and effective manner and in a substantially quantitative yield 17-methyl estradiol.

Other objects of this invention and advantageous features thereof will become apparent as the description proceeds.

In principle, the process according to the present invention consists in reacting estrone with methyl lithium. It is very surprising that methyl lithium produces said compound when considering that the closely related magnesium-organic compounds do not react with estrone. The new process, therefore, is of considerable importance, since it permits the manufacture of the orally highly effective 17-methyl estradiol.

The following example serves to illustrate the present invention without, however, limiting the same thereto.

*Example 1*

A solution of methyl lithium, prepared from 20 g. of lithium metal, in 1 liter of absolute ether is added to a suspension of 20 g. of estrone in 1 liter of absolute ether, while stirring. Stirring at room temperature is continued for 2 to 3 hours and the mixture is subsequently boiled under reflux for 1 hour. After cooling, ice water is added to the reaction mixture which is then acidified with dilute hydrochloric acid. The clear ethereal solution is separated from the aqueous layer, washed with water until neutral, dried over sodium sulfate, filtered, and evaporated to dryness. 21 g. of a crystalline residue melting at 182–185° C. are obtained thereby. The pure 17-methyl estradiol, obtained after re-crystallization from acetic acid ethyl ester, has a melting point of 189–190° C. Yield: 95–98% of the theoretical yield.

The reaction of estrone with methyl lithium may, of course, be carried out in another inert organic solvent than ether, for instance, in benzene, cyclohexane, benzine, and the like solvents. Ether, however, is the preferred solvent, since hydrocarbons such as benzene and benzine have a retarding effect upon the reaction and usually require higher temperatures.

17-methyl estradiol obtained according to the above given example is a valuable new compound which is employed in hormone therapy with great advtange as an orally effective estrogenic compound.

Its physiological activity in the Allen-Doisy test, on subcutaneous administration of an oily solution, is about 3,000,000 to 4,000,000 rat units per gram. On oral administration, its activity is about 50,000 rat units per gram while estrone has an oral activity of only 17,000 rat units per gram and estradiol has an oral activity of only 20,000 rat units per gram.

The new compound is preferably administered in the form of tablets, dragees, pills, lozenges and the like. One may also prepare emulsions or suspensions of said estrogenic compound in water or in aqueous solutions.

When preparing tablets, pills, dragees and the like preparations, the commonly used diluting agents, binders, and the like are employed, such as sugar, lactose, talc, starch, bolus alba, pectin, and as binders, gelatin, gum arabic, methyl cellulose, yeast extract, agar, tragacanth, and others.

Such compositions, for instance, in tablet dosage unit form, contain between about 10 $\gamma$ and about 100 $\gamma$ of the new 17-methyl estradiol per dosage unit and a solid pharmaceutical carrier.

Of course, many changes and variations in the reaction conditions, the reaction temperature and duration, the methods of working up the reaction mixture and of isolating and purifying 17-methyl estradiol and the like may be made by those skilled in the art in accordance with the principles set forth herein and in the claims annexed hereto.

We claim:

1. In a process of producing 17-methyl estradiol having a melting point of about 189–190° C. and exhibiting an oral estrogenic activity of about 50,000 rat units per gram, the steps comprising adding a methyl lithium solution in ether to a suspension of estrone and ether while stirring, continuing stirring at room temperature for several hours, heating the reaction mixture to boiling under reflux to complete the reaction, and hydrolyzing the reaction mixture to produce 17-methyl estradiol.

2. In a process of preparing 17-methyl estradiol having a melting point of about 189–190° C. and exhibiting an oral estrogenic activity of about 50,000 rat units per gram, the steps comprising adding methyl lithium in ether solution to estrone, causing the reaction mixture to react and to form the methyl lithium addition compound of estrone, and hydrolyzing said methyl lithium-estrone addition product.

3. In a process of producing 17-methyl estradiol having a melting point of about 189–190° C. and exhibiting an oral estrogenic activity of about 50,000 rat units per gram, the steps comprising mixing methyl lithium and estrone in an inert organic solvent, causing said mixture to react and to form the methyl lithium addition product of estrone, and hydrolyzing said addition product to form 17-methyl estradiol.

References Cited in the file of this patent

UNITED STATES PATENTS

| | | |
|---|---|---|
| 2,076,098 | Schoeller | Apr. 6, 1937 |
| 2,330,215 | Hildebrandt | Sept. 28, 1943 |

FOREIGN PATENTS

| | | |
|---|---|---|
| 189,749 | Switzerland | June 1, 1937 |
| 194,979 | Switzerland | Mar. 16, 1938 |

OTHER REFERENCES

J. A. M. A., August 27, 1938, page 784.